United States Patent
Zhang et al.

(10) Patent No.: US 10,225,830 B2
(45) Date of Patent: Mar. 5, 2019

(54) PROCESSING METHOD OF DATA PACKET, TERMINAL, BASE STATION AND SYSTEM

(71) Applicant: Huawei Technologies Co., Ltd., Shenzhen (CN)

(72) Inventors: Tao Zhang, Shenzhen (CN); Bo Lin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 72 days.

(21) Appl. No.: 15/347,559

(22) Filed: Nov. 9, 2016

(65) Prior Publication Data

US 2017/0064679 A1    Mar. 2, 2017

Related U.S. Application Data

(63) Continuation of application No. PCT/CN2014/077193, filed on May 9, 2014.

(51) Int. Cl.
*H04W 72/04* (2009.01)
*H04L 12/863* (2013.01)
(Continued)

(52) U.S. Cl.
CPC .......... *H04W 72/042* (2013.01); *H04L 12/28* (2013.01); *H04L 47/28* (2013.01); *H04L 47/624* (2013.01);
(Continued)

(58) Field of Classification Search
CPC ............... H04W 72/04; H04W 72/042; H04W 72/0446; H04W 28/02; H04L 12/28; H04L 12/863; H04L 47/28; H04L 47/624
See application file for complete search history.

(56) References Cited

U.S. PATENT DOCUMENTS 8,054,836 B2 * 11/2011 Fischer ................. H04W 36/02
370/394
8,588,175 B2 * 11/2013 Kim ...................... H04L 1/1841
370/328
(Continued)

FOREIGN PATENT DOCUMENTS

| CN | 101529816 A | 9/2009 |
|---|---|---|
| CN | 101689922 A | 3/2010 |
| CN | 102316515 A | 1/2012 |

OTHER PUBLICATIONS

"PDCP reordering in dual connectivity," 3GPP TSG-RAN WG2 #85bis, Valencia, Spain, Tdoc R2-141544, pp. 1-11, 3$^{rd}$ Generation Partnership Project, Valbonne, France (Mar. 31-Apr. 4, 2014).

*Primary Examiner* — Tri H Phan
(74) *Attorney, Agent, or Firm* — Leydig, Voit & Mayer, Ltd.

(57) ABSTRACT

Embodiments of present invention provide a processing method of a data packet, a terminal, a base station and a system, the terminal comprises: a receiving unit, configured to receive a first instruction sent by a first base station; a processing unit, configured to stop reordering data packets according to the first instruction received by the receiving unit, or start reordering the data packets according to the first instruction received by the receiving unit. The technical solutions provided by the embodiments of the present invention are used to achieve that an orderliness of the data packets in the terminal is guaranteed.

20 Claims, 4 Drawing Sheets

(51) Int. Cl.
*H04L 12/28* (2006.01)
*H04W 28/02* (2009.01)
*H04L 12/841* (2013.01)

(52) U.S. Cl.
CPC ....... *H04W 28/02* (2013.01); *H04W 72/0446* (2013.01)

(56) References Cited

U.S. PATENT DOCUMENTS

| | | | | |
|---|---|---|---|---|
| 8,792,495 | B1* | 7/2014 | Dixon | H04L 47/624 |
| | | | | 370/394 |
| 9,565,683 | B2* | 2/2017 | Tang | H04L 5/0044 |
| 9,572,141 | B2* | 2/2017 | Tang | H04L 5/0044 |
| 9,848,429 | B2* | 12/2017 | Tang | H04L 5/0044 |
| | | | | 370/329 |
| 2002/0095512 | A1* | 7/2002 | Rana | H04L 47/10 |
| | | | | 709/232 |
| 2008/0095116 | A1* | 4/2008 | Kim | H04L 1/1841 |
| | | | | 370/331 |
| 2008/0212561 | A1* | 9/2008 | Pani | H04L 47/10 |
| | | | | 370/346 |
| 2008/0310368 | A1 | 12/2008 | Fischer | |
| 2009/0034476 | A1* | 2/2009 | Wang | H04W 28/06 |
| | | | | 370/331 |
| 2009/0046626 | A1* | 2/2009 | Shao | H04L 47/10 |
| | | | | 370/320 |
| 2009/0296655 | A1* | 12/2009 | Tamura | H04L 47/34 |
| | | | | 370/331 |
| 2014/0071947 | A1* | 3/2014 | Kim | H04L 1/1841 |
| | | | | 370/331 |
| 2014/0071948 | A1 | 3/2014 | Kim et al. | |
| 2014/0112157 | A1* | 4/2014 | Han | H04L 69/22 |
| | | | | 370/242 |
| 2015/0327236 | A1* | 11/2015 | Lin | H04W 72/0406 |
| | | | | 370/329 |
| 2017/0048643 | A1* | 2/2017 | Lee | H04L 1/1829 |

* cited by examiner

PROCESSING METHOD OF DATA PACKET, TERMINAL, BASE STATION AND SYSTEM

CROSS-REFERENCE TO RELATED APPLICATIONS

This application is a continuation of International Application No. PCT/CN2014/077193, filed on May 9, 2014, the disclosure of which is hereby incorporated by reference in its entirety.

TECHNICAL FIELD

Embodiments of the present invention relate to the wireless communication technology, and in particular, to a processing method of a data packet, a terminal, a base station and a system.

BACKGROUND

In a wireless communication network, a terminal may support two radio bearer (RB) types, i.e., a first bearer type and a second bearer type, wherein, under the first bearer type, the terminal receives data packets of radio bearers only from a first base station, under the second bearer type, the terminal receives the data packets of the radio bearers from the first base station and a second base station at the same time.

Presently, in a procedure of a radio bearer converting from the second bearer type to the first bearer type, a method of reordering received data packets by a packet data convergence protocol (PDCP) entity relevant to the radio bearer in the terminal is: the PDCP entity keeps reordering the received data packets until a lower edge of a reordering window is larger than a serial number m, the PDCP entity stops reordering the data packets, wherein, the lower edge of the reordering window is a serial number of the earlier data packet among all data packets which are still considered for reordering; the serial number m is a largest serial number of a data packet received by the PDCP entity before a radio link control (RLC) entity is released, wherein, the RLC entity is associated with the radio bearer and corresponds to the second base station.

However, the data packet corresponding to the largest serial number received by the PDCP entity before the RLC entity is released is not always the last data packet which needs to be reordered, therefore, the above technical solution leads to the PDCP entity in the terminal stopping reordering data packets prematurely, thereby the disordering of the data packets sent to an upper layer by the PDCP entity may appear.

SUMMARY

To this end, embodiments of the present invention provide a processing method of a data packet, a terminal, a base station and a system, to achieve that an orderliness of data packets in the terminal is guaranteed.

In a first aspect, an embodiment of the present invention provides a terminal, including:

a receiving unit, configured to receive a first instruction sent by a first base station;

a processing unit, configured to stop reordering data packets according to the first instruction received by the receiving unit, or start reordering the data packets according to the first instruction received by the receiving unit.

In a first possible implementation of the first aspect, the first instruction includes: a start flag, or a stop flag, or a type domain in a control packet data unit (PDU), or a bit in the control PDU, or a byte in the control PDU, or a length domain of the data packet, or a bit in the data packet.

Combining the first aspect or the first possible implementation of the first aspect, in a second possible implementation of the first aspect, the receiving unit is specifically configured to: receive the first instruction and a serial number sent by the first base station;

the processing unit is specifically configured to: stop reordering the data packets according to the first instruction and the serial number, or, start reordering the data packets according to the first instruction and the serial number.

Combining the second possible implementation of the first aspect, in a third possible implementation of the first aspect, the processing unit is specifically configured to: obtain the serial number according to the first instruction received by the receiving unit, and stop reordering the data packets according the first instruction and the serial number, or, start reordering the data packets according the first instruction and the serial number.

Combining the second possible implementation of the first aspect or the third possible implementation of the first aspect, in a fourth possible implementation of the first aspect, the stop reordering the data packets according the first instruction and the serial number, or, start reordering the data packets according the first instruction and the serial number specifically includes:

according to the first instruction and the serial number, after receiving a data packet corresponding to the serial number, stop reordering the data packets, or, after receiving a data packet corresponding to the serial number, start reordering the data packets.

Combining the second possible implementation of the first aspect or the third possible implementation of the first aspect, in a fifth possible implementation of the first aspect, the stop reordering the data packets according the first instruction and the serial number, or, start reordering the data packets according the first instruction and the serial number specifically includes:

according to the first instruction and the serial number, after sending a data packet corresponding to the serial number to an upper layer, stop reordering the data packets, or, after sending the data packet corresponding to the serial number to the upper layer, start reordering the data packets.

Combining the second possible implementation of the first aspect or the third possible implementation of the first aspect, in a sixth possible implementation of the first aspect, the stop reordering the data packets according the first instruction and the serial number, or, start reordering the data packets according the first instruction and the serial number specifically includes:

according to the first instruction and the serial number, after a serial number of an earliest data packet among data packets which are still considered for reordering is larger than the serial number, stop reordering the data packets, or, after the serial number of the earliest data packet among the data packets which are still considered for reordering is larger than the serial number, start reordering the data packets.

Combining the first aspect or the first to the sixth possible implementations of the first aspect, in a seventh possible implementation of the first aspect, the receiving unit is specifically configured to: receive the first instruction and a timing duration of a timer sent by the first base station;

the processing unit is specifically configured to: stop reordering the data packets according to the first instruction and the timing duration of the timer received by the receiving unit, or, start reordering the data packets according to the first instruction and the timing duration of the timer received by the receiving unit.

Combining the first to the seventh possible implementations of the first aspect, in an eighth possible implementations of the first aspect, the stop reordering the data packets according to the first instruction and the timing duration of the timer received by the receiving unit, or, start reordering the data packets according to the first instruction and the timing duration of the timer received by the receiving unit specifically includes:

according to the first instruction and the timing duration of the timer, start the timer, and after the timer is timeout, stop reordering the data packets, or, according to the first instruction and the timing duration of the timer, start the timer, and after the timer is timeout, start reordering the data packets.

In a second aspect, an embodiment of the present invention also provides a base station, the base station is a first base station, and the first base station includes:

a processing unit, configured to obtain a first instruction;

a sending unit, configured to send the first instruction obtained by the processing unit to a terminal, wherein, the first instruction is used for the terminal to stop reordering data packets or start reordering the data packets according to the first instruction.

In a first possible implementation of the second aspect, the first instruction includes: a start flag, or a stop flag, or a type domain in a control PDU, or a bit in the control PDU, or a byte in the control PDU, or a length domain of the data packet, or a bit in the data packet.

Combining the second aspect or the first possible implementation of the second aspect, in a second possible implementation of the second aspect, the processing unit is specifically configured to: obtain the first instruction and a serial number;

the sending unit is specifically configured to: send the first instruction and the serial number to the terminal, wherein, the first instruction and the serial number are used for the terminal to stop reordering the data packets or start reordering the data packets according to the first instruction and the serial number.

Combining the second aspect or the first possible implementation of the second aspect, in a third possible implementation of the second aspect, the processing unit is specifically configured to: obtain the first instruction and a timing duration of a timer;

the sending unit is specifically configured to: send the first instruction and the timing duration of the timer to the terminal, wherein, the first instruction and the timing duration of the timer are used for the terminal to stop reordering the data packets or start reordering the data packets according to the first instruction and the timing duration of the timer.

In a third aspect, an embodiment of the present invention also provides a processing system of a data packet, the system includes a terminal and a first base station; wherein, the first base station is configured to obtain a first instruction, and send the obtained first instruction to the terminal;

the terminal is configured to stop reordering data packets according to the first instruction or start reordering the data packets according to the first instruction.

In a fourth aspect, an embodiment of the present invention also provides a processing method of a data packet, including:

receiving, by a terminal, a first instruction sent by a first base station;

stopping, by the terminal, reordering data packets according to the received first instruction, or starting, by the terminal, reordering the data packets according to the received first instruction.

In a first possible implementation of the fourth aspect, the first instruction includes: a start flag, or a stop flag, or a type domain in a control packet data unit (PDU), or a bit in the control PDU, or a byte in the control PDU, or a length domain of the data packet, or a bit in the data packet.

Combining the fourth aspect or the first possible implementation of the fourth aspect, in a second possible implementation of the fourth aspect, the receiving, by the terminal, the first instruction sent by the first base station, includes: receiving, by the terminal, the first instruction and a serial number sent by the first base station;

the stopping, by the terminal, reordering the data packets according to the received first instruction, or starting, by the terminal, reordering the data packets according to the received first instruction, comprises: stopping, by the terminal, reordering data packets according to the first instruction and the serial number, or, starting reordering the data packets according to the first instruction and the serial number.

Combining the second possible implementation of the fourth aspect, in a third possible implementation of the fourth aspect, the stopping, by the terminal, reordering data packets according to the received first instruction, or starting, by the terminal, reordering the data packets according to the received first instruction, includes:

obtaining, by the terminal, the serial number according to the received first instruction;

stopping, by the terminal, reordering the data packets according to the first instruction and the serial number, or, starting reordering the data packets according to the first instruction and the serial number.

Combining the second possible implementation of the fourth aspect or the third possible implementation of the fourth aspect, in a fourth possible implementation of the fourth aspect, the stopping, by the terminal, reordering data packets according to the first instruction and the serial number, or, starting reordering the data packets according to the first instruction and the serial number, includes:

stopping, by the terminal, reordering the data packets according to the first instruction and the serial number after receiving a data packet corresponding to the serial number, or, starting, by the terminal, reordering the data packets after receiving the data packet corresponding to the serial number.

Combining the second possible implementation of the fourth aspect or the third possible implementation of the fourth aspect, in a fifth possible implementation of the fourth aspect, the stopping, by the terminal, reordering data packets according to the first instruction and the serial number, or, starting reordering the data packets according to the first instruction and the serial number, includes:

stopping, by the terminal, reordering the data packets according to the first instruction and the serial number after sending a data packet corresponding to the serial number to an upper layer, or starting, by the terminal, reordering the data packets after sending the data packet corresponding to the serial number to the upper layer.

Combining the second possible implementation of the fourth aspect or the third possible implementation of the fourth aspect, in a sixth possible implementation of the fourth aspect, the stopping, by the terminal, reordering data packets according to the first instruction and the serial number, or, starting reordering the data packets according to the first instruction and the serial number, includes:

stopping, by the terminal, reordering the data packets according to the first instruction and the serial number after a serial number of an earliest data packet among data packets which are still considered for reordering is larger than the serial number, or, starting, by the terminal, reordering the data packets after the serial number of the earliest data packet among the data packets which are still considered for reordering is larger than the serial number.

Combining the fourth aspect or the first to sixth possible implementations of the fourth aspect, in a seventh possible implementation of the fourth aspect, the receiving, by the terminal, the first instruction sent by the first base station, includes: receiving, by the terminal, the first instruction and a timing duration of a timer sent by the first base station;

the stopping, by the terminal, reordering the data packets according to the received first instruction, or starting, by the terminal, reordering the data packets according to the received first instruction, includes: stopping, by the terminal, reordering the data packets according to the received first instruction and the timing duration of the timer, or, starting, by the terminal, reordering the data packets according to the received first instruction and the timing duration of the timer.

Combining the seventh possible implementation of the fourth aspect, in an eighth possible implementation of the fourth aspect, the stopping, by the terminal, reordering the data packets according to the received first instruction and the timing duration of the timer, or, starting, by the terminal, reordering the data packets according to the received first instruction and the timing duration of the timer, includes:

according to the first instruction and the timing duration of the timer, by the terminal, starting the timer, and stopping reordering the data packets after the timer is timeout, or, according to the first instruction and the timing duration of the timer, by the terminal, starting the timer, and starting reordering the data packets after the timer is timeout.

In a fifth aspect, an embodiment of the present invention also provides a processing method of a data packet, including:

obtaining, by a first base station, a first instruction;

sending, by the first base station, the obtained first instruction to a terminal, wherein, the first instruction is used for the terminal to stop reordering data packets or start reordering the data packets according to the first instruction.

In a first possible implementation of the fifth aspect, the first instruction includes: a start flag, or a stop flag, or a type domain in a control PDU, or a bit in the control PDU, or a byte in the control PDU, or a length domain of the data packet, or a bit in the data packet.

Combining the fifth aspect or the first possible implementation of the fifth aspect, in a second possible implementation of the fifth aspect, the obtaining, by the first base station, the first instruction, includes: obtaining, by the first base station, the first instruction and a serial number;

the sending, by the first base station, the obtained first instruction to the terminal, includes: sending, by the first base station, the first instruction and the serial number to the terminal, wherein, the first instruction and the serial number are used for the terminal to stop reordering the data packets or start reordering the data packets according to the first instruction and the serial number.

Combining the fifth aspect or the first possible implementation of the fifth aspect, in a third possible implementation of the fifth aspect, the obtaining, by the first base station, the first instruction, includes: obtaining, by the first base station, the first instruction and a timing duration of a timer;

the sending, by the first base station, the obtained first instruction to the terminal, includes: sending, by the first base station, the first instruction and the timing duration of the timer to the terminal, wherein, the first instruction and the timing duration of the timer are used for the terminal to stop reordering the data packets or start reordering the data packets according to the first instruction and the timing duration of the timer.

By means of the above technical solutions, the terminal may stop or start reordering the data packets according to the first instruction sent by the first base station, so that the terminal may control the reordering of the data packets according to the instruction of the first base station, thus effectively avoiding the problem of data packet disordering due to stopping reordering the data packets in advance or failing to start reordering the data packets in time, and therefore guaranteeing that data packets in the terminal are in order.

BRIEF DESCRIPTION OF DRAWINGS

To describe technical solutions in embodiments of the present invention more clearly, the following briefly describes the accompanying drawings in the description of embodiments. The accompanying drawings illustrate only some embodiments of the present invention, and those skilled in the art can derive other drawings from these drawings without creative efforts.

DESCRIPTION OF EMBODIMENTS

To better understood the technical solutions of present invention, embodiments of the present invention are described comprehensively with reference to the accompanying drawings.

It will be appreciated that the embodiments described are only some embodiments of the present invention, not all embodiments. Other embodiments derived by those skilled in the art on the basis of the embodiments herein without any creative effort fall within the protection scope of the present invention.

Figure 1:
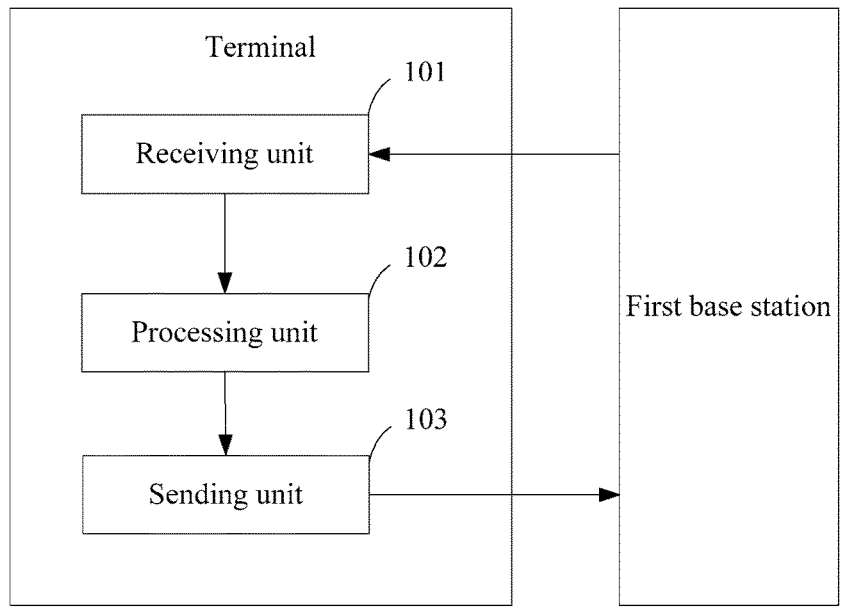
FIG. 1 is a functional block diagram of a terminal according to an embodiment of the present invention.

Please refer to FIG. 1, which is a functional block diagram of a terminal according to an embodiment of the present invention. As shown in the figure, the terminal comprises:

a receiving unit 101, configured to receive a first instruction sent by a first base station;

a processing unit 102, configured to stop reordering data packets according to the first instruction received by the receiving unit 101, or, start reordering data packets according to the first instruction received by the receiving unit 101.

Wherein, the terminal may include a user equipment (UE), and the user equipment may comprise a personal computer (PC), a laptop, a mobile phone, or a tablet personal computer.

Figure 2A:
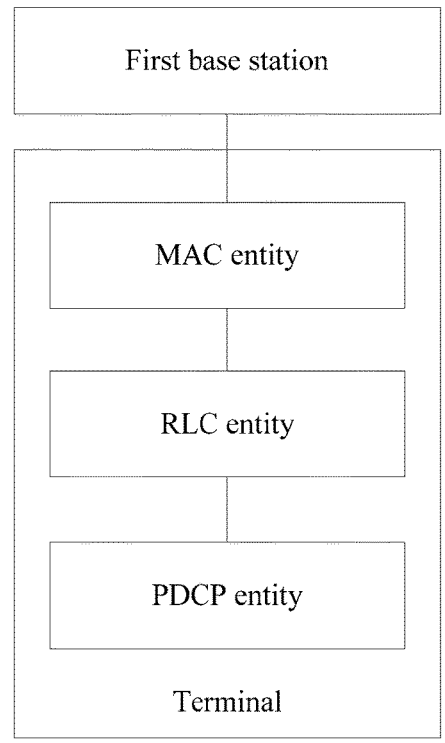
FIG. 2(a) and FIG. 2(b) are network architecture diagrams of a terminal and one or more base stations according to embodiments of the present invention.
Figure 2B:
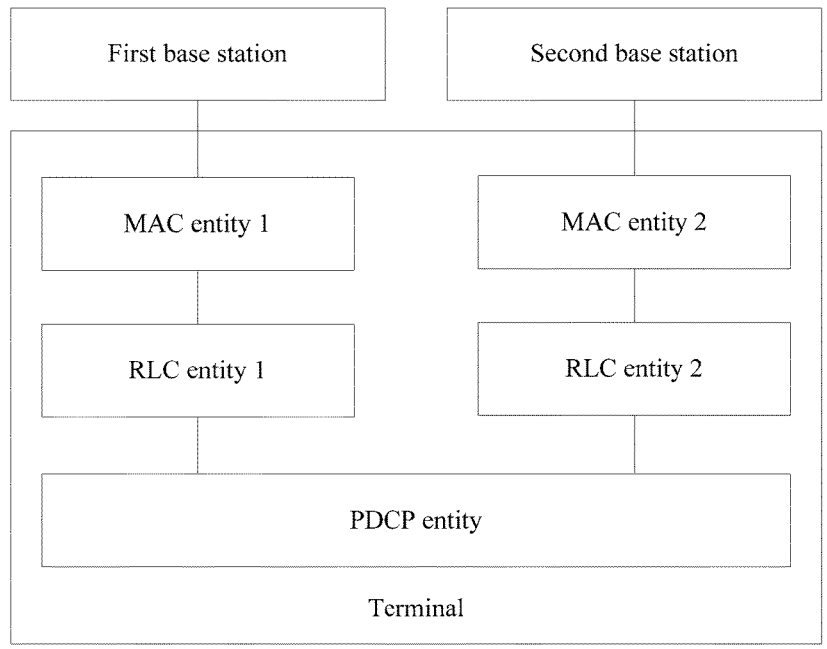

Please refer to FIG. 2(*a*) and FIG. 2(*b*), which are network architecture diagrams of a terminal and a base station according to embodiments of the present invention. As shown in FIG. 2(*a*), entities associated with one first bearer type of radio bearer in the terminal include: one PDCP entity, one RLC entity and one medium access control (MAC) entity. As shown in FIG. 2(*b*), entities associated with one second bearer type of radio bearer in the terminal include: one PDCP entity, two RLC entities (i.e., a first RLC entity and a second RLC entity in FIG. 2(*b*)) and two MAC entities (i.e., a first MAC entity and a second MAC entity in FIG. 2(*b*)). Wherein, the first MAC entity and the second are directed to a first base station and a second base station, respectively; the first PLC entity is associated with the first MAC entity; the second PLC entity is associated with the second MAC entity. As shown in FIG. 2(*a*), for the first bearer type of radio bearer, the first base station sends data packets to the MAC entity of the terminal, the MAC entity processes the data packets and then sends the same to the RLC entity, the RLC entity reorders the data packets and then sends the same to the PDCP entity, the PDCP entity does not reorder the data packets again, but submits the data packets sent by the RLC entity to an upper layer of the PDCP entity successively, wherein the upper layer of the PDCP entity may be an internet protocol (IP) layer, a transmission control protocol (TCP) layer, or a user datagram protocol (UDP) layer and so on among a network. As shown in FIG. 2(*b*), for the second bearer type of radio bearer, the first base station sends part of the data packets to the first MAC entity of the terminal, then the data packets arrive at the PDCP entity via the first RLC entity; the first base station sends the rest of the data packets to the second base station, the second base station sends the rest of the data packets to the second MAC entity of the terminal, then the rest of the data packets arrive at the PDCP entity via the second RLC entity. Both of the first RLC entity and the second RLC entity reorder their received data packets, and the PDCP entity also needs to reorder all data packets received from the first RLC entity and the second RLC entity. For the second bearer type of radio bearer, the first base station may assign one serial number to each data packet, the serial number may be a sequence number (SN), also may be a count value Count, wherein, the count value Count is a count value with a limited number of bits, first at least one bit of the count value Count is a hyper frame number (HFN), and the rest of the bits of the count value Count is the sequence number. The PDCP entity associated with the radio bearer of the second bearer type of radio bearer needs to reorder the data packets according to the serial numbers assigned by the first base station to the data packets.

One radio bearer can be converted from the second bearer type into the first bearer type. To realize the conversion of the radio bearer, the first base station needs to send a radio resource control (RRC) message to the terminal, wherein, the RRC message is configured to instruct the terminal to convert the established certain radio bearer from the second bearer type into the first bearer type. According to this instruction from the first base station, the terminal releases resources occupied by the second RLC entity associated with the radio bearer, so as to convert the radio bearer from the second bearer type into the first bearer type.

Preferably, the receiving unit 101 is configured specifically to: receive the first instruction and a serial number sent by the first base station; the processing unit 102 is configured specifically to: according to the first instruction and the serial number, after receiving the data packet corresponding to the serial number, stop reordering data packets, or, after receiving the data packet corresponding to the serial number, start reordering the data packets.

Preferably, the processing unit 102 is configured specifically to: according to the first instruction received by the receiving unit 101, obtain the serial number, and according to the first instruction and the serial number, stop reordering data packets, or, according to the first instruction and the serial number, start reordering the data packets.

Wherein, the according to the first instruction and the serial number, stop reordering the data packets, or, according to the first instruction and the serial number, start reordering the data packets, comprises specifically the following manners:

The first manner: according to the first instruction and the serial number, after receiving the data packet corresponding to the serial number, stop reordering the data packets, or, after receiving the data packet corresponding to the serial number, start reordering the data packets.

The second manner: according to the first instruction and the serial number, after sending the data packet corresponding to the serial number to the upper layer, stop reordering the data packets, or, after sending the data packet corresponding to the serial number to the upper layer, start reordering the data packets.

The third manner: according to the first instruction and the serial number, after a serial number of the earliest data packet among data packets which are still considered for reordering is larger than the serial number, stop reordering the data packets, or, after a serial number of the earliest data packet among data packets which are still considered for reordering is larger than the serial number, start reordering the data packets.

It is noted that, when the first instruction is used to instruct the terminal to stop reordering data packets, the data packet responding to the serial number may be the last data packet which needs to be reordered by the terminal, that is to say, the data packets, which are received after the data packet is sent to the upper layer, are in order, and the data packets do not need to be reordered by the terminal, or, after the terminal receives the data packet, if there are any other data packets received by the terminal, those other data packets must be in order, which do not need to be reordered by the terminal. Or, when the first instruction is used to instruct the terminal to stop reordering data packets, the data packet responding to the serial number may be a first data packet which does not need to be reordered by the terminal, that is to say, those data packets, which are received by the terminal after the terminal receives this data packet, are in order, which do not need to be reordered by the terminal. Or, when the first instruction is used to instruct the terminal to start reordering data packets, the data packet responding to the serial number may be a first data packet which needs to be reordered by the terminal, that is to say, those data packets, which are received by the terminal after the terminal receives this data packet, may be in disorder, which need to be reordered by the terminal. Or, when the first instruction is used to instruct the terminal to start reordering data packets, the data packet responding to the serial number may be the last data packet which does not need to be reordered by the terminal, that is to say, those data packets, which are received by the terminal after the terminal receives this data packet, may be in disorder, which need to be reordered by the terminal.

For instance, the receiving unit 101 may receive a control packet data unit (PDU) sent by the first base station, and the first instruction and the serial number are carried in the control PDU; wherein, the serial number may be a serial number of a data packet which is the last data packet received from the first base station within data packets which are not sent to the terminal successfully by the second base station before the terminal converts from the second bearer type into the first bearer type.

Preferably, the processing unit 102 discards a second data packet after the terminal converts from the second bearer type into the first bearer type, wherein a sequence number of the second data packet is larger than a sequence number of the first data packet finally received by the terminal before the conversion from the second bearer type into the first bearer type. The terminal may also include a sending unit 103, which is configured to send to the first base station the serial number of the first data packet and a serial number of a data packet whose serial number is the largest among data packets which are not received successfully by the terminal, so that the first base station sends the second data packet to the terminal according to the received serial numbers after the terminal stops reordering data packets.

Figure 3:
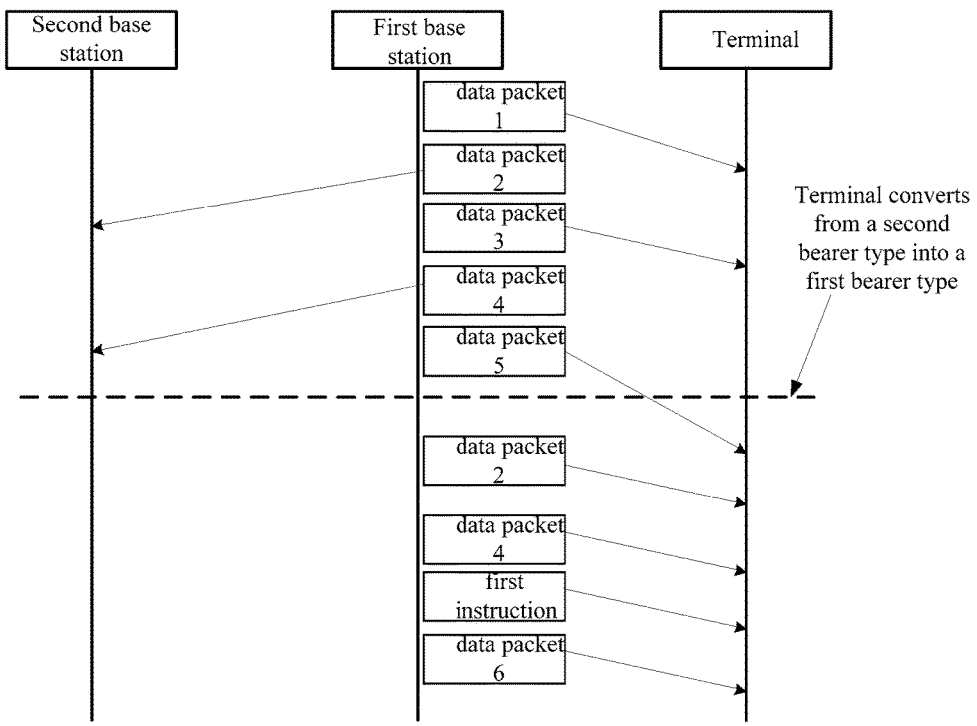
FIG. 3 is a schematic diagram of sending data packet by a base station to a terminal according to an embodiment of the present invention.

For instance, after the terminal converts from the first bearer type to the second bearer type and before the terminal stops reordering the data packets, if the terminal receives a data packet having serial number q (q is equal to 5 in FIG. 3) which is larger than m, the terminal discards the data packet, wherein the serial number m refers to the serial number of the first data packet finally received by the terminal before the terminal converts from the second bearer type to the first bearer type. As shown in FIG. 3, m may equal to 3.

When converting from the second bearer type to the first bearer type, the terminal sends a data packet state report to the first base station, wherein, the data packet state report includes: serial number m of the first data packet (m is equal to 3 in FIG. 3) and serial number q of a data packet having the largest serial number in the data packets unsuccessful received by the terminal (q is equal to 2 in FIG. 3). Wherein, the first data packet is a data packet finally received by the terminal before the conversion from the second bearer type into the first bearer type According to serial number m and serial number q, the first base station knows that, before sending the data packet having the serial number m and after sending the data packet having the serial number p, data packets (the serial number q of the data packet is 5 in FIG. 3) whose serial numbers are larger than the serial number m in the data packets sent by the first base station will be discarded by the terminal. Therefore, after the terminal stops the reordering operation, the base station sends the data packets discarded by the terminal to the terminal.

As shown in FIG. 3, after receiving a data packet having serial number 1 and a data packet having serial number 3, the terminal converts from the second bearer type into the first bearer type. Then, the terminal receives a data packet having serial number 5, but the terminal discards the data packet having serial number 5. Then, the terminal sends the serial number 3 and the serial number 2 to the first base station. The first base station sends a data packet having serial number 2 and a data packet having serial number 4 to the terminal. Then the terminal determines that the data packet having serial number 2 and the data packet having serial number 4 are disordered data packets, and therefore the terminal does not stop the reordering operation. After that, the first base station resends the discarded data packet, i.e., the data packet having the serial number 5, to the terminal. In this way, after receiving the data packet having the serial number 5, the terminal determines that this data packet is not a disordered data packet, and therefore stops the reordering operation.

Wherein, the disordered data packets refers to unreceived data packets between the earliest received data packet and the latest received data packet in the received data packets. For instance, serial numbers of the data packets which have been received by the terminal are 1, 3 and 5, and the data packets having the serial numbers 2 and 4 are the unreceived data packets; therefore the data packets having the serial numbers 2 and 4 are the disordered data packets.

Preferably, the receiving unit 101 is configured specifically to: receive the first instruction and a timing duration of a timer sent by the first base station; the processing unit 102 is configured specifically to: stop reordering data packets according to the first instruction and the timing duration of the timer received by the receiving unit, or, start reordering data packets according to the first instruction and the timing duration of the timer received by the receiving unit.

Wherein, the stop reordering data packets according to the first instruction and the timing duration of the timer received by the receiving unit, or, start reordering data packets according to the first instruction and the timing duration of the timer received by the receiving unit, specifically comprises:

according to the first instruction and the timing duration of a timer, start the timer, and after the timer is timeout, stop reordering the data packets, or, according to the first instruction and the timing duration of a timer, start the timer, and after the timer is timeout, start reordering the data packets.

Specifically, the first base station may generate a timing duration of a timer for the timer of the terminal, then send it to the terminal; the terminal receives the timing duration of the timer; and after converting from the second bear type into the first bear type, the terminal starts the timer according to the timing duration of the timer; and when the timer is timeout, the terminal stops reordering data packets. Preferably, the timer may enable a new timer, or make use of an existing reordering timer. Here, the timing duration of the timer needs to be set long enough, for instance, the timing duration of the timer may be equal to or lager than a first duration, the first duration refers to a duration needed for the first base station to send a data packet to the terminal, wherein the data packet may be the data packet which the second base station does not successfully send to the terminal before the terminal converts from the second bearer type into the first bearer type. Therefore, it can be made sure that the data packet reordering is stopped after the first base station successfully sends to the terminal the data packet which the second base station does not successfully send.

Wherein, the receiving unit 101 and the processing unit 102 may be located in the PDCP entity of the terminal.

In the embodiment of the present invention, the method of stopping reordering data packets by the terminal is setting by the terminal the timing duration of the reordering timer to 0 or releasing memory resources occupied by the reordering timer.

Figure 4:
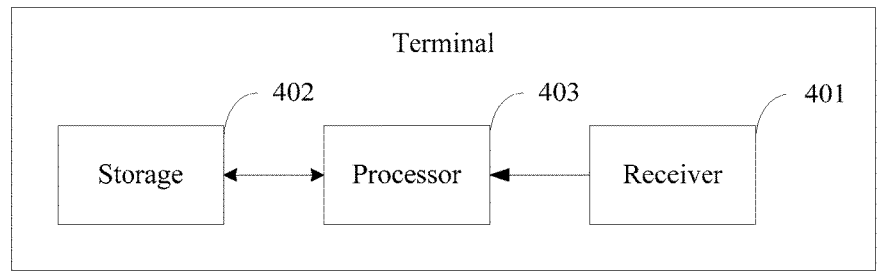
FIG. 4 is a structure schematic diagram of a terminal according to an embodiment of the present invention.

Please refer to FIG. 4, which is a structure schematic diagram of a terminal according to an embodiment of the present invention. As shown in the figure, the terminal includes:

a receiver 401, configured to receive a first instruction sent by a first base station;

a storage 402, configured to store information including program routine;

a processor 403, coupled to the storage 402 and the receiver 401 respectively, and configured to control executing of the program routine, which specifically includes: according to the first instruction received by the receiver 401, stop reordering data packets, or, according to the first instruction received by the receiver 401, start reordering data packets.

Figure 5:
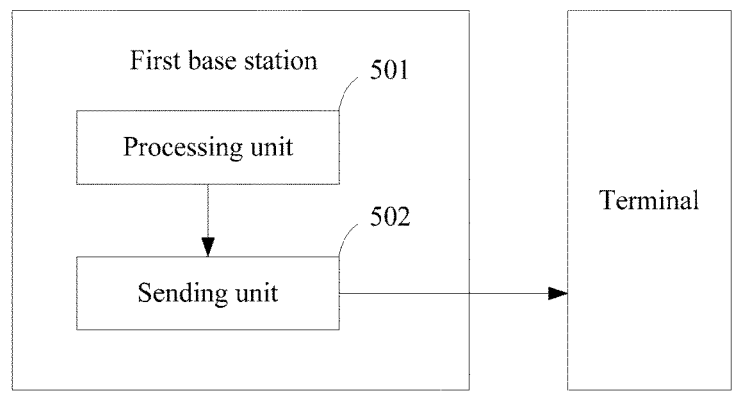
FIG. 5 is a functional block diagram of a base station according to an embodiment of the present invention.

Please refer to FIG. 5, which is a functional block diagram of a base station according to an embodiment of the present invention. As shown in the figure, a base station is a first base station, the first base station includes:

a processing unit 501, configured to obtain a first instruction;

a sending unit 502, configured to send the first instruction obtained by the processing unit 501 to a terminal, wherein the first instruction is used to instruct the terminal to stop reordering data packet or start reordering data packet according to the first instruction.

Preferably, the first instruction includes: a start flag, or a stop flag, or a type domain in a control PDU, or a bit in the control PDU, or a byte in the control PDU, or a length domain of the data packet, or a bit in the data packet.

Preferably, the processing unit 501 is specifically configured to: obtain the first instruction and a serial number; the sending unit 502 is specifically configured to: send the first instruction and the serial number to the terminal, wherein the first instruction and the serial number are used for the terminal to stop reordering data packets according to the first instruction and the serial number, or, start reordering data packets according to the first instruction and the serial number.

For instance, the processing unit 501 may obtain the serial number according to at least one information of the following information: data packet already sent to the second base station by the first base station, data packet never sent to the second base station by the first base station, data packet already successfully sent to the terminal by the second base station, data packet not sent to the terminal by the second base station, data packet already successfully sent to the terminal by the first base station, data packet not sent to the terminal by the first base station, data packet already successfully received by the terminal, and data packet not received by the terminal. Wherein, the serial number of the data packet already successfully sent to the terminal by the second base station and the serial number of data packet not sent to the terminal by the second base station may be sent to the first base station by the second base station; the serial number of data packet already successfully received by the terminal and the serial number of data packet not received by the terminal may be sent to the first base station by the terminal.

Preferably, the sending unit 502 sends the first instruction to the terminal, which comprises specifically: the sending 502 sends an RRC message to the terminal, and the RRC message carries the first instruction.

Preferably, the first instruction may be the start flag, or may be the stop flag. When the first instruction is the start flag, the first instruction is used to instruct the PDCP entity in the terminal to start reordering the data packets; and when the first instruction is the stop flag, the first instruction is used to instruct the PDCP entity in the terminal to stop reordering the data packets.

Preferably, the first instruction may be used to: instruct the terminal to convert an existing radio bearer from the first bearer type into the second bearer type, the terminal establishes a second RLC entity associated with the radio bearer according to the first instruction, and a PDCP entity associated with the radio bearer starts reordering data packets; or, the first instruction may be used to: instruct the terminal to convert an existing radio bearer from the second bearer type to the first bearer type, the terminal releases a second RLC entity associated with the radio bearer according to the first instruction, and a PDCP entity associated with the radio bearer stopping reordering data packets.

Preferably, the first instruction may be used to: instruct the terminal to configure the reordering timer, the terminal configures the reordering timer according to the first instruction, and the PDCP entity starts reordering data packets according to configuration of the reordering timer; or the first instruction may be used to: instruct the terminal to release the reordering timer, the terminal releases the reordering timer according to the first instruction, and the PDCP entity stops reordering data packets.

Preferably, the first instruction may be used to: instruct the terminal to set the time length of the reordering timer to zero, and the PDCP entity stops reordering data packets according to the first instruction; or, the first instruction may be used to: instruct the terminal to set the time length of the reordering timer to non-zero, and the PDCP entity starts reordering data packets according to the first instruction.

Preferably, the RRC message may also carry a serial number of a data packet, when a lower edge of a reordering window is larger than the serial number, the PDCP entity in the terminal stops reordering data packets; or, after the PDCP entity receives a data packet corresponding to the serial number, the PDCP entity stops reordering data packets; or, after the PDCP entity sends a data packet corresponding to the serial number to an upper layer, the PDCP entity stops reordering data packets.

Wherein, the reordering window refers to a queue including all serial numbers of data packets which are still considered for reordering, and the lower edge of the reordering window refers to a serial number of the earliest data packet among all the data packets which are still considered for reordering. For instance, as shown in FIG. 3, when the data packets having the serial numbers 1, 3 and 5 are received by the terminal, the serial numbers of data packets which are still considered for reordering and included in the reordering window are 2, 3, 4, and 5, wherein, the lower edge of the reordering window, i.e., the serial number of the earliest data packet among the data packets which are still considered for reordering is 2. To clarify, in 3GPP TS 36.322 protocol, the lower edge of the reordering window is defined, i.e., the PLC sequence number of the earliest RLC Data PDU that is still considered for reordering, which corresponds to the serial number of the earliest data packet among all the data packets which are still considered for reordering. This definition defines the lower edge of the reordering window in the RLC entity, but the definition of the lower edge of the reordering window in PDCP entity in present invention is same as the definition of the lower edge of the reordering window in the RLC entity, only replacing the RLC sequence number with PDCP sequence number in this definition, and replacing the RLC Data PDU with PDCP Data PDU.

For instance, as shown in FIG. 3, the RRC message may carry a serial number 5. After PDCP entity receives a data packet having a serial number 4, the PDCP entity may send the data packet having the serial number 4 and a data packet having the serial number 5 received before to the upper layer in sequence, at this time, the lower edge of the reordering window is 6 which is larger than the serial number 5 carried in RRC message, thus the PDCP entity stops reordering data packets. Or, the RRC message may carry a serial number 4. The PDCP entity receives a data packet having the serial number 4, and sends the data packet having the serial number 4 and the data packet having the serial number 5 to the upper layer in sequence, then the PDCP entity stops reordering data packets. Or, the RRC message may also carry a serial number 6. After receiving a data packet having a serial number 6, the PDCP entity stops reordering data packets.

Preferably, the sending unit 502 sends the first instruction to the terminal, which specifically comprises: the sending unit 502 sends a control protocol data unit (PDU) to the terminal, wherein the control PDU carries the first instruction.

For instance, the first instruction may be the type domain of the control PDU, and the type domain may have three bits. The value of the three bits may be 010, 011, or 100 and so on. For another instance, the first instruction may be one bit in the control PDU. When a value of the bit is 1, it is indicated that the PDCP entity needs to stop reordering data packets. When the value of the bit is 0, it is indicated that the PDCP entity needs to start reordering data packets. For another instance, the first instruction may be one byte in the control PDU. When a value of the byte is 11111111, it is indicated that the PDCP entity needs to stop reordering data packets. When the value of the byte is 00000000, it is indicated that the PDCP entity needs to start reordering data packets.

After receiving the above control PDU, the terminal may stop reordering data packets immediately. For instance, as shown in FIG. 3, the first base station may send the control PDU to the terminal immediately after sending the data packet having the serial number 4 to the terminal. After receiving the control PDU, the PDCP entity stops reordering data packets immediately.

After receiving the control PDU, the terminal may, according to the relative order of receiving the control PDU and other data packet, determine a serial number of the data packet, and then stop reordering data packets according to the serial number.

For instance, immediately after sending the data packet having the serial number 5 to the terminal, the first base station sends the control PDU to the terminal. Immediately after receiving the data packet having the serial number 5, the PDCP entity receives the control PDU. Therefore, after the lower edge of the reordering window is larger than the serial number 5, the PDCP entity stops immediately reordering data packets.

For another instance, as shown in FIG. 3, immediately after sending the control PDU to the terminal, the first base station sends the data packet having the serial number 5 to the terminal. Immediately after receiving the control PDU, the PDCP entity receives the data packet having the serial number 5. Therefore, after the lower edge of the reordering window is larger than the serial number 5, the PDCP entity stops immediately reordering data packets.

After receiving the control PDU, the terminal may determine whether a predefined stop condition is satisfied. If it is determined that the predefined stop condition is satisfied, the terminal stops reordering data packets. If it is determined that the predefined stop condition is not satisfied, the terminal does not stop reordering data packets. For instance, as shown in FIG. 3, immediately after sending the data packet having the serial number 5 to the terminal, the first base station sends the control PDU to the terminal. After receiving the control PDU, the PDCP entity may determine whether the second RLC entity has been released. If the second RLC entity is released, the PDCP entity immediately stops reordering data packets. If the second RLC entity is not released yet, the PDCP entity may wait until the second RLC entity is released and all data packets sent by the second RLC entity are processed (such as, sent to an upper layer, discarded or the serial numbers thereof are put into the reordering window), and the PDCP entity stops reordering data packets.

Preferably, a serial number of a data packet may be carried in the control PDU, thus, after sending the data packet corresponding to the serial number to the terminal, or before sending the data packet corresponding to the serial number to the terminal, the first base station sends the control PDU to the terminal.

After receiving the control PDU, the terminal determines, according to the carried serial number therein, whether the PDCP entity has already received the data packet corresponding to the serial number. If the PDCP entity has already received the data packet, the PDCP entity may stop reordering data packets immediately. Whereas, if the PDCP entity has not received it yet, after receiving the data packet corresponding to the serial number, the PDCP entity stops reordering data packets.

Or, after the terminal receives the control PDU, according to the serial number carried therein, the PDCP entity determines whether the data packet corresponding to the serial number has been sent to the upper layer already. If the PDCP entity has sent the data packet corresponding to the serial number to the upper layer already, the PDCP entity stops reordering data packets immediately. Whereas, if the PDCP entity has not sent it to the upper layer, after the PDCP entity sends the data packet corresponding to the serial number to the upper layer, the PDCP entity stops reordering data packets.

Or, after receiving the control PDU, according to the serial number carried therein, the terminal determines whether the lower edge of the reordering window is larger than the serial number. If the lower edge of the reordering window is larger than the serial number, the PDCP entity stops reordering data packets immediately. If the lower edge of the reordering window is equal to or less than the serial number, after the lower edge of the reordering window is larger than the serial number, the PDCP entity stops reordering data packets.

For instance, the first base station may send the control PDU to the terminal, wherein the first instruction and the serial number 4 may be carried in the control PDU. If the terminal receives the control PDU, after receiving the data packet having the serial number 4 and sending the data packets having the serial number 4 and the serial number 5 to the upper layer, the PDCP entity stops reordering data packets. Or, the first instruction and the serial number 5 may be carried in the control PDU. If the terminal receives the control PDU, after the PDCP entity sends the data packet having the serial number 5 to the upper layer, the PDCP entity stops reordering data packets. Or, after the lower edge of the reordering window is larger than the serial number 5, the PDCP entity stops reordering data packets. Or, the first instruction and the serial number 6 may be carried in the control PDU, if the terminal receives the control PDU, after the PDCP entity receives the data packet having the serial number 6, the PDCP entity stops reordering data packets.

Preferably, the sending unit 502 may send a data packet to the terminal, wherein the data packet carries the first instruction so that the terminal stops reordering data packets according to the first instruction after receiving the data packet. In other words, the first base station does not carry the first instruction via an additional control PDU, but carries the first instruction via the data packet sent to the terminal.

For instance, the first instruction may be the length domain of the data packet. When the length domain is used to indicate that the length of the data included in the data packet is 0, it represents that the PDCP entity needs to stop reordering data packets. For another instance, the first instruction may one bit of the data packet. When a value of the bit is 1, it represents that the PDCP entity needs to stop reordering data packets. When the value of the bit is 0, it represents that the PDCP entity needs to start reordering data packets.

For instance, the first instruction may be carried in the data packet having the serial number 5 sent to the terminal by the first base station, thus, after receiving the data packet, the PDCP entity stops reordering data packets. Or, after the PDCP entity submits the data packet to the upper layer, the PDCP entity stops reordering data packets. Or, after the lower edge of the reordering window is larger than the serial number 5, the PDCP entity stops reordering data packets.

Preferably, the processing unit 501 is configured specifically to: obtain the first instruction and timing duration of a timer; the sending unit 502 is configured specifically to: send the first instruction and the timing duration of the timer to the terminal, wherein the first instruction and the timing duration of the timer are used for the terminal to stop reordering data packets or start reordering data packets according to the first instruction and the timing duration of the timer.

Specifically, the first instruction is used to instruct the terminal to convert an existing radio bearer from the first bearer type to the second bearer type. The terminal releases the second RLC entity associated with the radio bearer according to the first instruction to finish bearer conversion. As releasing the second RLC entity, the terminal starts the timer according to the timing duration of the timer. After the timer is time out, the PDCP entity stops reordering data packets, or, after the timer is time out, the PDCP entity starts reordering data packets.

For instance, the method of obtaining the timing duration of the timer by first base station may be that: if the first base station may confirm that after a certain time, serial numbers of the data packets received by the PDCP entity of the terminal must be increasing in turn, the first base station determines the timing duration from the certain time to the time when the second RLC entity is released as the timing duration of the timer.

To clarify, the serial number of the data packet sent by the first base station to the terminal is not unlimited. If the serial number of the data packet reaches an upper limit value of the serial number, the serial number will be assigned from a lower limit value for the data packet. For instance, the range of the serial number is 1-10000, in this way, the serial number of the $10001^{th}$ data packet is 1. Based upon so, in the above description, the largest serial number refers to a largest serial number in the range of serial number. There are two scenes of the latest data packet received from the first base station: one scene is that the serial number of the data packet is not used circularly, then the serial number of the latest data packet received from the first base station is the largest serial number among all data packets received; another scene is that the serial number of the data packet is used circularly, then the serial number of the latest data packet received from the first base station may be not the largest serial number among all data packets received.

Figure 6:
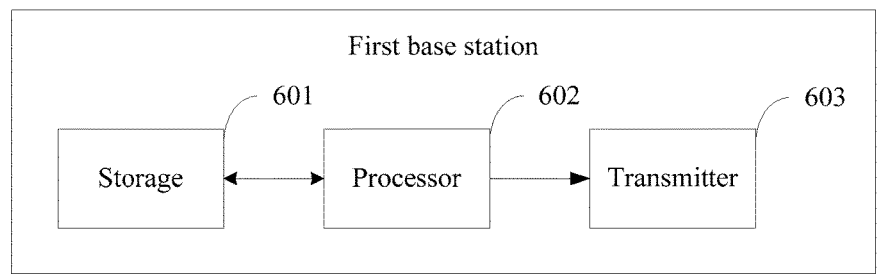
FIG. 6 is a structure schematic diagram of a first station according to an embodiment of the present invention.

Please refer to FIG. 6, which is a structure schematic diagram of a first base station according to an embodiment of the present invention. As shown in the figure, the terminal includes:

a storage 601, configured to store information including program routine;

a processor 602, coupled to the storage 601 and a transmitter 603 respectively, and configured to control executing of the program routine, which specifically includes: obtain a first instruction;

a transmitter 603, configured to send the first instruction obtained by the processor 602 to the terminal, wherein the first instruction is used for the terminal to stop reordering data packets or start reordering data packets according to the first instruction.

In an embodiment of the present invention, the first base station may be a master evolved NodeB (MeNB) of the terminal, and the second base station may be a secondary evolved NodeB (SeNB) of the terminal.

Figure 7:
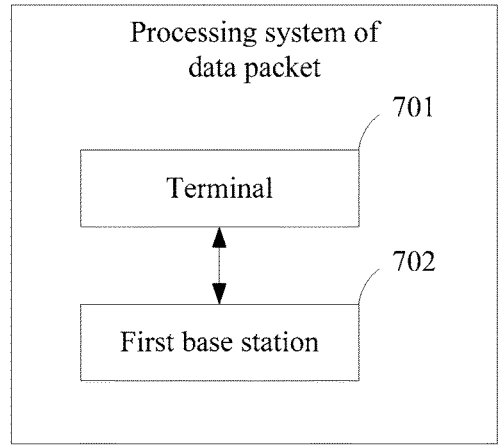
FIG. 7 is a block diagram of a processing system of a data packet according to an embodiment of the present invention.

Please refer to FIG. 7, which is a block diagram of a processing system of a data packet according to an embodiment of the present invention. As shown in the figure, the system includes a terminal 701 and a first base station 702; wherein, The first base station 702 is configured to obtain a first instruction, and send the obtained first instruction to the terminal 701.

the terminal 701 is configured to stop reordering data packets according to the first instruction or start reordering the data packets according to the first instruction.

If using the prior art, before the second RLC entity is released, the data packets having the serial numbers 1, 3, and 5 are sent directly to the terminal by the first base station, and the data packets having the serial numbers 2 and 4 are forwarded to the second base station after the first base station assigns the serial numbers, so that the second base station sends these data packets to the terminal. But before the second RLC entity is released, the second base station does not successfully send the data packets having the serial numbers 2 and 4 to the terminal, thus these data packets still need to be sent by the first base station. After the PDCP entity of the terminal receives the data packet having the serial number 1, the data packet is not the disordered data packet, and the PDCP entity directly sends the data packet to the upper layer. Afterwards, the PDCP entity receives the data packet having the serial number 3 before receiving the data packet having the serial number 2, and the PDCP entity does not send the data packet having the serial number 3 to the upper layer, and starts a reordering timer. The data packet having the serial number 2 is waited before the reordering timer is time out. At this time, the serial number of the earliest data packet sent by the first base station among the data packets waiting for reordering is 2. That is to say, the lower edge of the reordering window is 2. The largest serial number of the data packets received by the PDCP entity is 3 before the second RLC entity is released. Therefore, the lower edge (equal to 2) of the reordering window is not larger than the largest serial number (equal to 3) of the data packets received by the PDCP entity before the second RLC entity is released. Therefore, the PDCP entity continues reordering data packets, which means that the PDCP entity may wait for the arrival of the data packet having the serial number 2 as long as the reordering timer is not time out. When the PDCP entity receives the data packet having the serial number 2 sent by the first base station, the PDCP entity closes the reordering timer, puts the data packet having the serial number 2 in front of the data packet having the serial number 3, and sends them to the upper layer in sequence. At this time, although the PDCP entity receives the data packet having the serial number 5, but does not receive the data packet having the serial number 4. Therefore, it cannot send the data packet having the serial number 5 to the upper layer. Therefore, the PDCP entity should restart the reordering timer at this time to wait for the data packet having the serial number 4 within a timing range of reordering timer. But at this time the lower edge of the reordering window is 4 which is larger than the largest serial number (equal to 3) of the data packets received by the PDCP entity before the second RLC entity is released. According to the prior art, the PDCP entity should stop reordering data packets at this time, which means stopping waiting for the data packet having the serial number 4 and sending the data packet having the serial number 5 to the upper layer directly. Afterwards, the PDCP entity may receive the data packet having the serial number 4 sent by the first base station, then the PDCP entity may send the data packet having the serial number 4 to the upper layer only after sending the data packet having the serial number 5, which results in the disordering of the data packets.

Using the above technical solution provided by the present invention, the first base station may send the first instruction to the terminal. The terminal may stop reordering data packets or start reordering data packets according to the first instruction. For instance, the first base station may send a serial number of a data packet or a timing duration to the terminal, and according to the serial number or the timing duration, the terminal may further determine an exact time to stop reordering data packets or start reordering data packets. The first instruction, the serial number of the data packet or the timing duration may be carried in an RRC message, a control PDU or a data packet. In this way, it may make sure that the reordering of the data packets is stopped after the last data packet which needs to be reordered is sent to the upper layer, and may make sure that the reordering of data packets is started before the first data packet which needs to be reordered is received, thus avoiding the problem of data packet disordering due to stopping reordering in advance or delaying the start of reordering in the prior art, and therefore guaranteeing that data packets are in order in the terminal.

An embodiment of the present invention further provides a method embodiment for implementing each unit in the above device embodiment.

Figure 8:
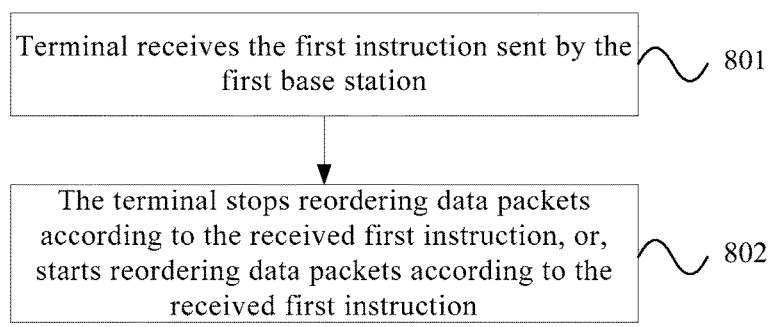
FIG. 8 is a flowchart of a processing method of data packets according to an embodiment of the present invention.

An embodiment of the present invention provides a processing method of data packets. Please refer to FIG. 8, which is a flowchart of a processing method of data packets according to an embodiment of the present invention. As shown in the FIG. 8, the method includes the following steps:

Step 801, a terminal receives a first instruction sent by a first base station.

Step 802, the terminal stops reordering data packets according to the received first instruction or starts reordering data packets according to the received first instruction.

Wherein, the first instruction includes: a start flag, or a stop flag, or a type domain in a control packet data unit PDU, or a bit in the control PDU, or a byte in the control PDU, or a length domain of the data packet, or a bit in the data packet.

Embodiment One

The terminal receivers the first instruction and a serial number sent by the first base station; and stopping reordering data packets according to the received first instruction, or, starting reordering data packets according to the received first instruction, includes: the terminal stops reordering data packets according to the first instruction and the serial number, or, starts reordering data packets according to the first instruction and the serial number.

Embodiment Two

The terminal obtains a serial number according to the received first instruction; according to the first instruction and the serial number, stops reordering data packets, or, according to the first instruction and the serial number, starts reordering data packets.

In the embodiment one and embodiment two, according to the first instruction and the serial number, the terminal stops reordering data packets, or, according to the first instruction and the serial number, starts reordering data packets, which includes the following three implementation ways:

The first implementation way: according to the first instruction and the serial number, after receiving a data packet responding to the serial number, the terminal stops reordering data packets, or, after receiving a data packet responding to the serial number, the terminal starts reordering data packets.

The second implementation way: according to the first instruction and the serial number, after sending a data packet corresponding to the serial number to an upper layer, the terminal stops reordering data packets, or, after sending a data packet corresponding to the serial number to an upper layer, the terminal starts reordering data packets.

The third implementation way: according to the first instruction and the serial number, after a serial number of the earliest data packet among data packets which are still considered for reordering is larger than the serial number, the terminal stops reordering data packets, or, after a serial number of the earliest data packet among data packets which are still considered for reordering is larger than the serial number, the terminal starts reordering data packets.

Embodiment Three

The terminal receives the first instruction and a timing duration of a timer sent by the first base station, and according to the received first instruction and the timing duration of the timer, stops reordering data packets, or, according to the received first instruction and the timing duration of the timer, starts reordering data packets.

For instance, the method that, the terminal according to the received first instruction and the timing duration of the timer stops reordering data packets, or, according to the received first instruction and the timing duration of the timer, starts reordering data packets, may be: according to the first instruction and the timing duration of the timer, the terminal starts the timer, and after the timer is time out, stops reordering data packets, or, according to the first instruction and the timing duration of the timer, the terminal starts the timer, and after the timer is time out, starting reordering data packets.

Since steps in the embodiment may be executed by the terminal showed in FIG. 1 and FIG. 4, parts of the embodiment that are not described in detail may be referred to the relevant description of FIG. 1 and FIG. 4.

Figure 9:
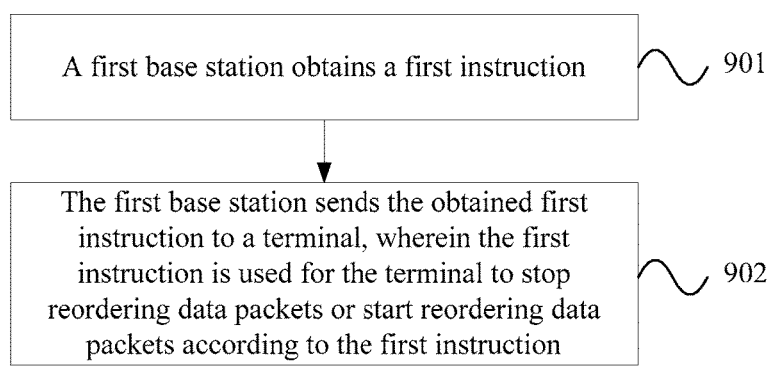
FIG. 9 is a flowchart of a processing method of data packet according to an embodiment of the present invention.

An embodiment of the present invention provides a processing method of data packets. Please refer to FIG. 9, which is a flowchart of a processing method of data packets according to an embodiment of the present invention. As shown in the FIG. 9, the method includes the following steps:

Step 901, a first base station obtains a first instruction.

Step 902, the first base station sends the obtained first instruction to a terminal, wherein the first instruction is used for the terminal to stop reordering data packets or start reordering data packets according to the first instruction.

Wherein, the first instruction includes: a start flag, or a stop flag, or a type domain in a control PDU, or a bit in the control PDU, or a byte in the control PDU, or a length domain of the data packet, or a bit in the data packet.

Embodiment One

The first base station obtains the first instruction and a serial number, and sends the first instruction and the serial number to the terminal, wherein the first instruction and the serial number are used for the terminal to stop reordering data packets or start reordering data packets according to the first instruction and the serial number.

Embodiment Two

The first base station obtains the first instruction and a timing duration of a timer, and sends the first instruction and the timing duration of the timer to the terminal, wherein, the first instruction and the timing duration of the timer are used for the terminal to stop reordering data packets or start reordering data packets according to the first instruction and the timing duration of the timer.

Since steps in the embodiment may be executed by the first base station showed in FIG. 5 and FIG. 6, parts of the embodiment that are not described in detail may be referred to the relevant description of FIG. 5 and FIG. 6.

Above are exemplary embodiments of the present invention, however the present invention is not limited to this, and any variations, substitutions, or improvements made under the spirit and principle of the present invention should fall within the protection scope of the present invention. Additionally, statements made herein characterizing the invention refer to an embodiment of the invention and not necessarily all embodiments.

What is claimed is:

1. A terminal supporting first and second bearer types, wherein the terminal individually receives data packets of radio bearers from a first base station under the first bearer type, and concurrently receives data packets of radio bearers from the first base station and a second base station under the second bearer type, the terminal comprising:
a receiver configured to receive a first instruction from the first base station, when radio bearers are converted from the second bearer type to the first bearer type or from the first bearer type to the second type; and
a processor configured to stop reordering data packets according to the first instruction, or start reordering data packets according to the first instruction.

2. The terminal according to claim 1, wherein the first instruction comprises: a start flag, a stop flag, a type domain in a control packet data unit (PDU), a bit in a control PDU, a byte in a control PDU, a length domain of a data packet, or a bit in a data packet.

3. The terminal according to claim 1, wherein the receiver is further configured to receive the first instruction and a serial number from the first base station;
wherein the processor is further configured to stop reordering the data packets according to the first instruction and the serial number, or start reordering the data packets according to the first instruction and the serial number.

4. The terminal according to claim 3, wherein, the processor is configured to:
obtain the serial number according to the first instruction received by the receiver.

5. The terminal according to claim 3, wherein stopping the reordering or starting the reordering comprises:
according to the first instruction and the serial number, after receiving a data packet corresponding to the serial number, stopping the reordering or starting the reordering.

6. The terminal according to claim 3, wherein stopping the reordering or starting the reordering comprises:
according to the first instruction and the serial number, after sending a data packet corresponding to the serial number to an upper layer, stopping the reordering or starting the reordering.

7. The terminal according to claim 3, wherein stopping the reordering or starting the reordering comprises:
according to the first instruction and the serial number, after a serial number of an earliest data packet among data packets which are still considered for reordering is larger than the received serial number, stopping the reordering or starting the reordering.

8. The terminal according to claim 1, wherein the receiver is further configured to: receive the first instruction and a timing duration of a timer from the first base station;
wherein the processor is further configured to: stop reordering the data packets according to the first instruction and the timing duration of the timer, or start reordering the data packets according to the first instruction and the timing duration of the timer.

9. The terminal according to claim 8, wherein stopping the reordering or starting the reordering comprises:
according to the first instruction and the timing duration of the timer, starting the timer, and after the timer times out, stopping the reordering or starting the reordering.

10. A base station comprising:
a processor configured to obtain a first instruction;
a transmitter configured to send the first instruction to a terminal supporting first and second bearer types, when radio bearers are converted from the second bearer type to the first bearer type or from the first bearer type to the second type,
wherein the first instruction facilitates the terminal stopping reordering data packets or starting reordering the data packets according to the first instruction, and
wherein the terminal individually receives data packets of the radio bearers from the base station under the first bearer type, and the terminal concurrently receives the data packets of the radio bearers from the base station and another base station under the second bearer type.

11. The base station according to claim 10, wherein the first instruction includes: a start flag, a stop flag, a type domain in a control packet data unit (PDU), a bit in a control PDU, a byte in a control PDU, a length domain of a data packet, or a bit in a data packet.

12. The base station according to claim 10, wherein the processor is further configured to obtain the first instruction and a serial number;
   wherein the transmitter is further configured to send the first instruction and the serial number to the terminal, wherein the first instruction and the serial number facilitate the terminal stopping reordering the data packets or starting reordering the data packets according to the first instruction and the serial number.

13. The base station according to claim 10, wherein the processor is further configured to obtain the first instruction and a timing duration of a timer;
   wherein the transmitter is further configured to send the first instruction and the timing duration of the timer to the terminal, wherein the first instruction and the timing duration of the timer facilitate the terminal stopping reordering the data packets or starting reordering the data packets according to the first instruction and the timing duration of the timer.

14. A data packet processing method comprising:
   receiving, by a terminal, a first instruction from a first base station when radio bearers are converted from a second bearer type to a first bearer type or from the first bearer type to the second type,
      wherein the terminal (a) supports the first and second bearer types, (b) individually receives data packets of radio bearers from the first base station under the first bearer type, and (c) concurrently receives the data packets of the radio bearers from the first base station and a second base station under the second bearer type;
   stopping, by the terminal, reordering data packets according to the received first instruction, or starting, by the terminal, reordering data packets according to the received first instruction.

15. The method according to claim 14, wherein the first instruction comprises: a start flag, a stop flag, a type domain in a control packet data unit (PDU), a bit in a control PDU, a byte in a control PDU, a length domain of a data packet, or a bit in a data packet.

16. The method according to claim 14, wherein receiving the first instruction further comprises: receiving the first instruction and a serial number from the first base station;
   wherein stopping the reordering or starting the reordering further comprises: stopping the reordering or starting the reordering according to the first instruction and the serial number.

17. The method according to claim 16, wherein stopping the reordering or starting the reordering further comprises:
   obtaining, by the terminal, the serial number according to the received first instruction.

18. The method according to claim 16, wherein stopping the reordering or starting the reordering further comprises:
   stopping the reordering or starting the reordering according to the first instruction and the serial number after receiving a data packet corresponding to the serial number.

19. The method according to claim 16, wherein stopping the reordering or starting the reordering further comprises:
   stopping the reordering or starting the reordering according to the first instruction and the serial number after sending a data packet corresponding to the serial number to an upper layer.

20. The method according to claim 16, wherein stopping the reordering or starting the reordering further comprises:
   stopping the reordering or starting the reordering according to the first instruction and the received serial number after a serial number of an earliest data packet among data packets which are still considered for reordering is larger than the received serial number.

* * * * *